Sept. 12, 1939.  G. W. SIMPSON  2,172,597

MAGNIFYING DEVICE

Filed June 21, 1938

Inventor

Glenn W. Simpson

Attorney

Patented Sept. 12, 1939

2,172,597

UNITED STATES PATENT OFFICE 2,172,597

MAGNIFYING DEVICE

Glenn W. Simpson, Rochester, N. Y.

Application June 21, 1938, Serial No. 214,999

1 Claim. (Cl. 88—39)

The invention relates to a magnifying device.

The object of the present invention is to provide a simple, practical and comparatively inexpensive magnifying device designed particularly for use on pencils and equipped with a socket or sheath adapted to be slipped over the rubber eraser of a pencil and capable of being firmly attached to the same for convenient use and to save time in finding the name, station and number in telephone directories, especially those in large cities where they are in fine print and close together and for such other purposes as a magnifying glass is adapted.

A further object of the invention is to provide a magnifying glass of this character adapted to be made without the means for applying it to a pencil to enable the magnifying glass to be used as a paper weight on a desk or the like.

Another object of the invention is to provide a magnifying glass having lens holding means adapted to be constructed of a single piece of solid, soft molded rubber with a rim portion of sufficient thickness to project beyond the planes of the surfaces of a lens both to avoid scratching, marring or otherwise injuring the surface of a desk and to prevent the surfaces of a lens from coming in contact with the same and being injuriously affected by contact with a desk or other surface when used as a paper weight or when placed on a desk or other surface and not in use.

It is also an object of the invention to provide a magnifying glass with a relatively thin, flexible, resilient neck portion for connecting the rim of the device with the pencil receiving socket or sheath so that the device may be flexed without liability of breaking the device or displacing the lens from the rim.

It is also an object of the invention to provide a magnifying device having a rim of a character capable of maintaining a lens firmly fixed therein so as to prevent any liability of displacement, loss or breakage of the lens through the latter becoming loose or disconnected from the mounting rim incident to sudden bumping, jarring or other contact of the rim with a desk or other object especially when the device is associated with a pencil or the like, the relatively thin, flexible neck between the rim and the attaching socket permitting such effective flexing of the neck as to take strain or accidental distortion from the rim in the event of a user tending to bend the rim or by reason of sudden or other contact of the rim with a desk or other object.

With these and other objects in view, the invention consists in the construction and novel combination and arrangement of parts hereinafter fully described, illustrated in the accompanying drawing and pointed out in the claim hereto appended, it being understood that various changes in the form, proportion and minor details of construction, within the scope of the claim, may be resorted to without departing from the spirit or sacrificing any of the advantages of the invention.

Figure 1:
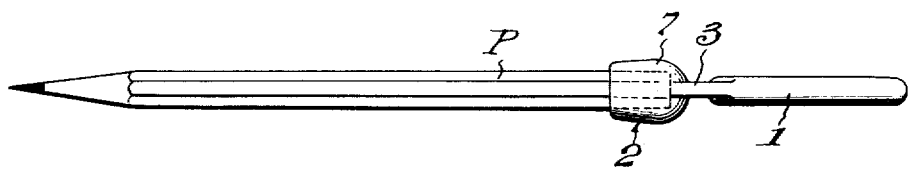
Fig. 1 is a plan view of a magnifying device constructed in accordance with this invention and shown applied to a pencil.

In the accompanying drawing in which are illustrated the preferred embodiments of the invention, the magnifying device, when adapted to be applied to a pencil, comprises in its construction a rim 1, a socket or sheath 2 and a thin connecting throat or neck 3 formed integral with the rim and the pencil receiving sheath or socket and forming a highly flexible, resilient connection between the rim 1 and the socket or sheath to permit the rim 1 and a lens 4 to be deflected without liability of injuring the device or displacing the lens from the rim. The rim, the pencil receiving socket or sheath 2 and the connecting neck 3 are preferably constructed of soft, molded rubber and the rim and the neck are preferably solid as shown and the rim which is shown in the form of an annulus but which may be of any other preferred configuration is provided in its inner periphery with a groove 5 which receives the marginal edge 6 of the lens 4 and in which the lens is firmly fixed and effectually held against accidental displacement.

The pencil receiving socket or sheath 2 is of tubular formation and is preferably exteriorly tapered and rounded or dome shape at 7 at its point of connection to the neck which is also preferably tapered towards the pencil receiving socket or sheath is elastic and it is adapted to be readily slipped or forced over the inner end of a pencil or over the rubber eraser of a pencil P and when applied thereto firmly connects the device with the pencil and maintains the magnifying glass in convenient position for ready use.

Figure 2:
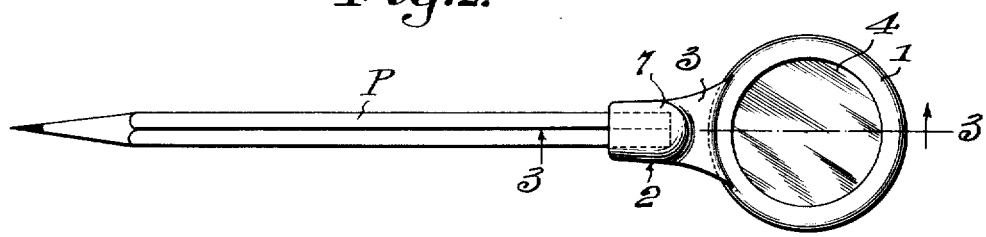
Fig. 2 is an edge view of the same.
Figure 3:
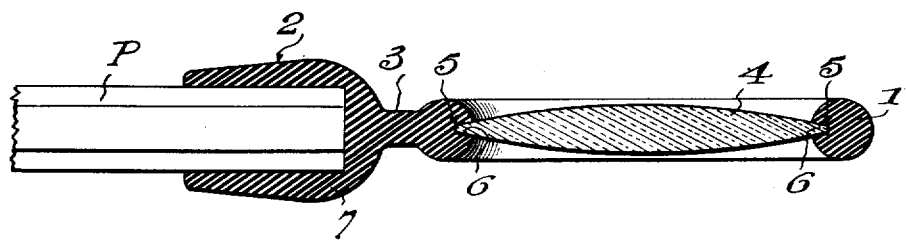
Fig. 3 is a longitudinal sectional view on an enlarged scale taken on the line 3—3 of Fig. 1.
Figure 4:
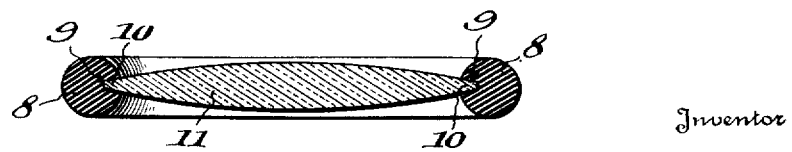
Fig. 4 is a sectional view of the magnifying device without the means for applying it to a pencil.
Figure 4:

In Fig. 4 of the drawing is illustrated a magnifying device consisting of a rim 8 of circular form provided in its inner periphery with an annular groove 9 which receives the marginal edge 10 of a lens 11. The device as shown in Fig. 4 may have a rim larger in size and larger in cross sectional diameter than when used on a pencil or the like so as to provide the requisite weight for holding papers or the like down on a table, desk or the like and it thus is adapted for effective use as a paper weight although the magnifying device shown in Figs. 1 to 3, inclusive, may be similarly employed and the soft, solid molded rubber rim may be made of less thickness when employed as a pencil attachment than the rim of the device when used as a paper weight but the thickness of the rim may be varied to suit conditions as will be readily understood.

What is claimed is:

A magnifying device including a circular lens, an annular rim surrounding the lens and provided at its inner periphery with a groove receiving said lens, a tubular pencil receiving socket, and a short, relatively thin, flexible connecting neck formed integral with the rim and the socket, said rim, socket and connecting neck consisting of a single piece of rubber and said neck being flexible and highly resilient to permit the rim and the lens to be deflected relative to said socket and thereby prevent dislodgment of the lens from the rim upon bumping of the rim accidentally against an object due to give of said neck incident to resiliency thereof.

GLENN W. SIMPSON.

CERTIFICATE OF CORRECTION.

Patent No. 2,172,597. September 12, 1939.

GLENN W. SIMPSON.

It is hereby certified that error appears in the printed specification of the above numbered patent requiring correction as follows: Page 1, second column, line 46, after the word "receiving" insert socket or sheath. The; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.

groove 9 which receives the marginal edge 10 of a lens 11. The device as shown in Fig. 4 may have a rim larger in size and larger in cross sectional diameter than when used on a pencil or the like so as to provide the requisite weight for holding papers or the like down on a table, desk or the like and it thus is adapted for effective use as a paper weight although the magnifying device shown in Figs. 1 to 3, inclusive, may be similarly employed and the soft, solid molded rubber rim may be made of less thickness when employed as a pencil attachment than the rim of the device when used as a paper weight but the thickness of the rim may be varied to suit conditions as will be readily understood.

What is claimed is:

A magnifying device including a circular lens, an annular rim surrounding the lens and provided at its inner periphery with a groove receiving said lens, a tubular pencil receiving socket, and a short, relatively thin, flexible connecting neck formed integral with the rim and the socket, said rim, socket and connecting neck consisting of a single piece of rubber and said neck being flexible and highly resilient to permit the rim and the lens to be deflected relative to said socket and thereby prevent dislodgment of the lens from the rim upon bumping of the rim accidentally against an object due to give of said neck incident to resiliency thereof.

GLENN W. SIMPSON.

CERTIFICATE OF CORRECTION.

Patent No. 2,172,597. September 12, 1939.

GLENN W. SIMPSON.

It is hereby certified that error appears in the printed specification of the above numbered patent requiring correction as follows: Page 1, second column, line 46, after the word "receiving" insert socket or sheath. The; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.